United States Patent [19]

Turner et al.

[11] 3,761,178

[45] Sept. 25, 1973

[54] APPARATUS FOR DETERMINING SPEED OF A MOVING OBJECT

[76] Inventors: Carroll G. Turner, P.O. Box 806, Rosenberg, Tex.; Robert W. Turner, 7815 Prestwood Dr., Houston, Tex. 77036

[22] Filed: Dec. 29, 1971

[21] Appl. No.: 213,292

[52] U.S. Cl. .................................... 356/24, 356/23
[51] Int. Cl. ............................................. G01p 3/40
[58] Field of Search ........................... 356/23, 24, 29

[56] References Cited
UNITED STATES PATENTS
1,880,774  10/1932  Butler ................................... 356/24
2,022,487  11/1935  Boaz ..................................... 356/24
3,687,035  8/1972  Morgan et al. ....................... 356/24

*Primary Examiner*—Ronald L. Wibert
*Attorney*—W. F. Hyer et al.

[57] ABSTRACT

Apparatus is disclosed for determining the speed of a moving object by conducting an image of the object through a lens to a mirror and exciting the mirror with variable frequency oscillations from a light source or a vibrating source, until the image on the mirror becomes substantially steady. The frequency of oscillations exciting the mirror are proportional to the speed of rotation of a wheel driving the moving object. The apparatus may be mounted in a handheld housing.

6 Claims, 6 Drawing Figures

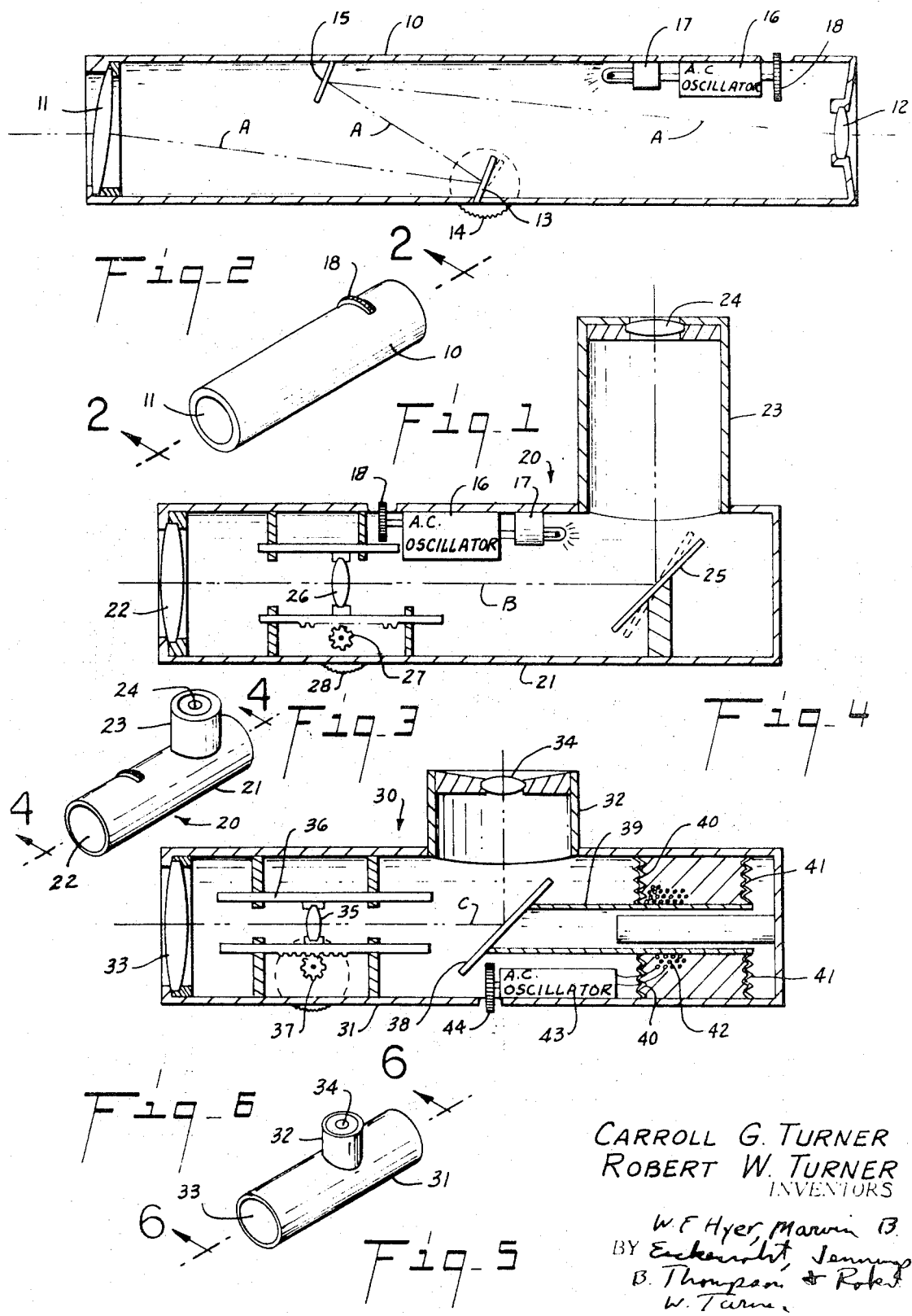

APPARATUS FOR DETERMINING SPEED OF A MOVING OBJECT

This invnetion relates to determining the speed of a moving object and in one of its aspects to hand-held apparatus for this purpose.

Radar or other complicated and expensive systems are generally used by police for checking the speed of a motor vehicle, Heretofore, no simple, small device has been provided to permit the policemen to take reliable field measurements of the speed of a moving vehicle and then to carry the apparatus on his person as he performs his duties. It is thus the primary object of this invention to provide apparatus for determining the speed of a moving object which is relatively inexpensive to build and simple in construction.

Another object of this invention is to provide such apparatus which may be carried on the person, such as in a shirt pocket.

Another object of this invention is to provide such apparatus which provides reliable measurements of speed of a moving object.

These objects are accomplished, in accordance with this invention, as well as other objects which will become apparent upon consideration of the description herein, the drawings and the claims appended hereto, by providing a housing, which may be hand-held and has an eyepiece at one end and a lens at another. The image of a rotating object, such as the wheel of a moving vehicle is conducted through the lens into the housing and means is provided in the housing for stopping the rotation of the image in the housing and conducting the stopped image to the eyepiece. This means maybe a mirror mounted in the housing and a source of alternating frequency ocillation, such as an audio frequency oscillator connected to a light source which excites the mirror with light at the frequency of the oscillations. When the frequency of the light oscillations equals the speed of rotation of the moving object, the image is stopped on the mirror and it can be viewed by a viewer. The frequency of the oscillations required to stop the image on the mirror is proportional to the speed of rotation of the rotating object. In the case where the rotating object is a wheel on a moving vehicle, this seeed of rotation is also proportional to the speed of the moving object and by appropriate scaling of the control knob for controlling the frequency of the oscillations, a direct readout of this speed can be given.

In another embodiment, the light image of the rotating object is conducted to a mirror in the hand-held housing and this mirror is excited or modulated by an electro-mechanical transducer which responds to an alternating current frequency. When the vibration of the mirror in response to this alternating current frequency equals the speed of rotation of the moving object, that image is stopped and can be viewed through the eyepiece of the hand-held housing.

In the drawings, wherein like reference numerals are used throughout to designate like parts and wherein are illustrated preferred embodiments of this invention, FIG. 1 is a perspective view of one embodiment of this invention in which the hand-held housing is cylindrical;

FIG. 2 is a sectional view taken at 2—2 of FIG. 1;

FIG. 3 is a perspective view of another embodiment of this invention in which the eyepiece is at right angles to the lens at the front of the hand-held housing;

FIG. 4 is a sectional view taken at 4—4 of FIG. 3;

FIG. 5 is is perspective view of another embodiment of this invention which is similar to that of FIG. 3 except that an electro mechanical transducer is utilized to stop the image in the housing, and FIG. 6 is a sectional view taken at 6—6 of FIG. 5.

Referring to the drawings, in FIG. 1, a hand-held housing 10, which in this view is cylindrical, includes a lens 11 at one end and an eyepiece 12 in the other end thereof. It is preferred that lens 11 be mounted in an inclined opening in the lens opening of housing 10 and images viewed through lens 11 are conducted into housing 10 onto a mirror 13 mounted on the bottom of housing 10 and about halfway between housing 10 and eyepiece 12. Mirror 13 is preferably mounted on a wheel 14 so that its angle of inclination with respect to lens 11 can be varied and images which strike mirror 13 are deflected toward the opposite wall of housing 10 and to a mirror 15 mounted on this opposite wall. Mirror 15 is also mounted in an inclined position on the opposite wall of housing 10 and deflects light images to eyepiece 12 where they may be viewed by a viewer. The path of the light images appearing at lens 11 and emerging from eyepiece 12 is designated as A in FIG 1.

Source means is provided in housing 10 for providing a source of variable frequency oscillations. In the illustrated embodiment, this means includes an alternating current oscillator 16 which is connected at its output to a lamp 17. Oscillator 16 is preferably battery operated and provides audio frequency signals of sufficient magnitude to drive lamp 17 at the frequency of oscillation of oscillator 16. The light emissions from lamp 17 are conducted to mirror 15 and illuminate the images thereon which are viewed through eyepiece 12. Oscillator 16 includes a knob 18 or other suitable means for varying the frequency of its oscillations through a range of frequencies that correspond to the speed of revolution of an object to be viewed through lens 11. Thus, when a rotating object, such as a wheel, is viewed through lens 11, its image thus appears on mirrors 13 and 15 and at eyepiece 12. The frequency of oscillations from source 16 can be varied until the image of the rotating object is stopped or appears to be stopped on mirror 15. Suitable scaling can be provided on knob 18 so that reading of the frequency of the oscillator will provide a direct indication of the speed of rotation of the object being viewed. In a moving motor vehicle, the speed of rotation of the wheels is directly proportional to the speed of movement of the automobile and, depending on the size wheel used, if this speed of rotation is known, then the speed of the moving vehicle can be determined. If the viewer of FIG. 1 is utilized by police to determine this speed, then the scaled reading on knob 18 can be converted to the speed of rotation of the moving object with required conversion factors taken into account or different size wheels used.

In FIGS. 3 and 4, housing 20 includes a first cylindrical portion 21 having a lens 22 at one end thereof and a second cylindrical portion 23 mounted on portion 21, and at right angles thereto, and having an eyepiece 24 at an end thereof. A mirror 25 is mounted in housing 20 so that images received on image path B through lens 22 are deflected at right angles from mirror 25 to eyepiece 24. In this embodiment, the source means includes an audio frequency oscillator 17 connected to lamp 17 in the manner described with respect to FIG. 1. The oscillating lamp illuminates the image on mirror 25 and when the frequency of the light source equals the speed of rotation of the image, the image is stopped or appears to be stopped to the viewer looking through lens 22. In this embodiment, the viewing is much like that of a reflex camera. Also, in order to focus the image from lens 22 on mirror 25, a lens 26 may be mounted on a movable carriage 26A in housing 20 and between lens 22 and mirror 25. In the embodiment illustrated, a rack and pinion drive 27 operated by a knob 28 is used to move lens 26 between its extreme positions to focus the image on mirror 25. Again the apparatus of FIGS. 3 and 4 may be used by police to determined the speed of a moving vehicle by scaling the dial 18 connected to oscillator 16.

In FIGS. 5 and 6, a housing 30 similar to that housing 20 in FIGS. 3 and 4 is provided and inlcudes a cylindrical member 31 with a smaller cylindrical member 32 mounted on member 31 at right angles thereto. A lens 33 is mounted in a lens opening at one end of member 31 and an eyepiece 34 is mou nted in the open end of member 32. An intermediate focusing lens 35 is mounted on a movable carriage 36 operated by a knob 37 in the manner described with respect to lens 26 of FIG. 4. However, in this embodiment, light images pass on a path from lens 33 through lens 35 onto a mirror 38 where they are deflected at right angles to eyepiece 34. Mirror 38 is mounted in housing 30 at a 45° angle with respect to path C by a support member 39, which may be a cylindrical tube made of nonelectrical conducting material. Member 39 is suspended at one end by bellows 40 and 41 of corrogated, nonconducting material, such as speaker cord paper. A coil 42 is wound around tube 39, and between bellows 40 and 41, and is connected to the output of a variable audio frequency oscillator 43, having a control knob 44 for controlling its output frequency. A permanent magnet 44 is mounted inside tube 39 and adjacent coil 42. Thus, when coil 42 is excited by alternating current oscillation from oscillator 43, tube 39 and mirror 38 will vibrate back and forth at the frequency of the oscillation in the same manner that a speaker cone would vibrate when excited by a similar electrical signal. If the frequency of vibrations of mirror 38 equals the frequency of rotation of the object the image of which is on mirror 38, then it is possible to stop the rotation of the image on mirror 38 for viewing by the user. Again, the frequency of oscillations from oscillator 43, which are controlled by knob 44 and can be appropiately scaled, would be proportional to the speed of rotation of the moving object the image of which is being viewed.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Hand-held apparatus for determining the speed of rotation of a rotating object, comprising, in combination: a cylindrical housing; sighting means for permitting viewing through said housing of said object, said sighting means including an eyepiece at one end of said housing and a lens at another end of the housing for conducting an image of said object into said housing; source means for providing a source of variable frequency oscillations; a mirror mounted in said housing positioned to receive the image of said object from said lens and conduct it to said eyepiece; and light means responsive to said variable frequency oscillations to provide light to said mirror at the frequency of said oscillations, to provide an image of said object at said mirror and at said eyepiece with the rotation thereof substantially stopped, whereby the frequency of said oscillations required to provide said stopped image is proportional to the speed of rotation of said object.

2. The apparatus of claim 1 further including adjustable means mounted between said lens and said mirror for focusing the image of said object on said mirror.

3. Hand-held apparatus for determining the speed of rotation of a rotating object, comprising, in combination: a cylindrical housing; sighting means for permitting viewing through said housing of said object, said sighting means including an eyepiece at one end of said housing and a lens at another end of the housing for conducting an image of said object into said housing; source means for providing a source of variable frequency oscillations; and means responsive to said variable frequency oscillations and to the image of said object in said housing to provide an image of said object at said eyepiece with the rotation thereof substantially stopped, whereby the frequency of said oscillations required to provide said stopped image is proportional to the speed of rotation of said object, said lastmentioned means including a first mirror mounted in said housing on one side thereof for receiving images from said lens nnd deflecting the received images to the opposite side of said housing, and a second mirror mounted in said housing on said opposite side thereof for deflecting the images received from said first mirror to said eyepiece.

4. The apparatus of claim 3 further including a light source connected to said source means and responsive to said variable frequency oscillation to excite one of said mirrors with light at the frequency of said oscillations.

5. The apparatus of claim 3 when said lens is inclined in order to conduct said image to said first mirror.

6. The apparatus of claim 5 further including means for varying the angle of inclination of said first mirror with respect to the angle of inclination of said lens.

* * * * *